United States Patent
Carter et al.

(10) Patent No.: US 6,564,864 B2
(45) Date of Patent: May 20, 2003

(54) METHOD OF OPERATING LOW PROFILE HEAT EXCHANGE METHOD WITH REDUCED WATER CONSUMPTION

(75) Inventors: Thomas P. Carter, Olney, MD (US); Branislav Korenic, Columbia, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/760,412

(22) Filed: Jan. 12, 2001

(65) Prior Publication Data

US 2001/0002620 A1 Jun. 7, 2001

Related U.S. Application Data

(62) Division of application No. 09/265,504, filed on Mar. 8, 1999, now Pat. No. 6,213,200.

(51) Int. Cl.[7] .................................................. B01F 3/04
(52) U.S. Cl. ...................... 165/285; 165/299; 165/110; 165/117; 165/900; 62/305; 62/309; 62/310; 261/151; 261/152; 261/153; 261/138; 261/158; 261/160
(58) Field of Search ................................ 165/110, 117, 165/900, 285, 299; 62/305, 310, 309; 261/152, 153, 151, 158, 160, 138, DIG. 77

(56) References Cited

U.S. PATENT DOCUMENTS

| | | | |
|---|---|---|---|
| 2,247,514 A | 7/1941 | Mart | 62/305 |
| 2,507,604 A | 5/1950 | Lawson | 62/305 |
| 2,661,933 A | 12/1953 | Deverall | 261/151 |
| 2,852,090 A | 9/1958 | Kelley | 261/151 |
| 2,890,864 A | 6/1959 | Stutz | 62/310 |
| 3,012,416 A | 12/1961 | Dart | 62/305 |
| 3,141,308 A | 7/1964 | Dart | 62/305 |

(List continued on next page.)

FOREIGN PATENT DOCUMENTS

| | | | |
|---|---|---|---|
| CA | 712874 | 7/1965 | .................. 62/310 |
| CA | 1038636 | 9/1978 | .................. 62/310 |
| CA | 1149729 | 7/1983 | |
| EP | 0057801 | 8/1982 | |
| JP | 5223749 | 2/1977 | |
| JP | 5340769 | 10/1978 | ............. F28D/5/02 |
| JP | 0254985 | 6/1990 | .................. 165/900 |
| JP | 2-154985 | 6/1990 | |
| JP | 5-25161 | 4/1993 | ............. F28C/1/16 |

OTHER PUBLICATIONS

Niagara Blower Company, Sales Brochure Entitled "Wet Surface Air Coolers" p. 41 ASHRAE Journal, Aug. 1979.

IMECO Incorporated, Sales Brochure Entitled "PF Evaporative Condensers"; no other information known (no date).

(List continued on next page.)

*Primary Examiner*—John K. Ford
(74) *Attorney, Agent, or Firm*—Edward J. Brosius

(57) ABSTRACT

A method of exchanging heat is disclosed. Process fluid is passed through a dry indirect contact heat exchange section while a main air stream is also passed through that section. The process fluid is passed through a second indirect contact heat exchange section while a second air stream is passed through that section. A third air stream is passed through a direct contact heat exchange section and mixed with the second air stream to define the main air stream. Evaporative liquid is selectively distributed over the second indirect contact heat exchange section and over the direct heat exchange section. The distribution of evaporative liquid over one section is independent of the distribution of evaporative liquid over the other section.

4 Claims, 6 Drawing Sheets

U.S. PATENT DOCUMENTS

| | | | |
|---|---|---|---|
| 3,148,516 A | 9/1964 | Kals | 62/305 |
| 3,365,909 A | 1/1968 | Brainard | 62/305 |
| 3,747,362 A | 7/1973 | Mercer | 62/171 |
| 3,820,353 A | 6/1974 | Shiraishi et al. | 62/305 |
| 3,865,911 A | 2/1975 | Lefevre | 261/140 |
| 3,923,935 A | 12/1975 | Cates | 261/259 |
| 3,925,523 A | 12/1975 | Cates | 261/DIG. 77 |
| 4,003,970 A | 1/1977 | Vodika | 261/159 |
| 4,076,771 A | 2/1978 | Houx, Jr. et al. | 261/159 |
| 4,112,027 A | 9/1978 | Cates | 261/111 |
| 4,119,140 A | 10/1978 | Cates | 165/67 |
| 4,236,574 A | 12/1980 | Bosne | 165/110 |
| 4,252,752 A | 2/1981 | Flaundroy | 261/153 |
| 4,315,873 A | 2/1982 | Smith | 261/158 |
| 4,367,183 A | 1/1983 | Carbonaro | 261/159 |
| 4,379,485 A | 4/1983 | Fisher, Jr. et al. | 165/110 |
| 4,476,065 A | 10/1984 | McKey | 261/23 R |
| 4,683,101 A | 7/1987 | Cates | 261/146 |
| 4,893,669 A | 1/1990 | Kashiwada et al. | 165/38 |
| 4,974,422 A | 12/1990 | Kocher | 62/305 |
| 5,078,205 A | 1/1992 | Bodas et al. | 165/110 |
| 5,390,502 A | 2/1995 | Storbeck et al. | 62/310 |
| 5,411,078 A | 5/1995 | Ares | 62/305 |
| 5,435,382 A | 7/1995 | Carter | 165/900 |
| 5,468,426 A | 11/1995 | Kato | 261/153 |
| 5,724,828 A | 3/1998 | Korenic | 62/305 |
| 5,816,318 A | 10/1998 | Carter | 165/110 |
| 6,142,219 A * | 11/2000 | Korenic et al. | 165/110 |
| 6,213,200 B1 * | 4/2001 | Carter et al. | 165/285 |

OTHER PUBLICATIONS

Rescorcon Incoporated, Sales Brochure Entitled "Wet Surface Air Coolers"; no other information known (no date).

"Parallel condensing combines best of all–wet, all–dry methods", Power, Jul./Aug. 1998, pp. 15–16.

Johnson Controls, Inc., Product/Technical Bulletin Entitled "VF Series Butterfly Valves 2 Through 20 in., Two–Way and Three–Way"; 1998; pp. 1–2.

Johnson Controls, Inc., Product/Technical Bulletin Entitled "System 350™ A350P Electronic Proportional Plus Integral Temperature Control"; 1996; pp. 1–2.

Johnson Controls, Inc., Product Sheet Entitled "SET189A Series Temperature Sensor"; (no date).

Super Radiator Coils, Product Bulletin Entitled "Bulletin 200 HW 291" (no date).

Super Radiator Coils, Product Bulletin Entitled "Bulletin 200 CW 1090—Type 5CW Water Cooling Coils" (no date).

Baltimore Aircoil Company, Sales Brochure Bulletin No. S384/1–ODA, Entitled "Low Profile Series VL". (No date).

Baltimore Aircoil Company, Sales Brochure Bulletin No. S408/1–FA, Entitled "Series V Industrial Fluid Coolers". (No date).

* cited by examiner

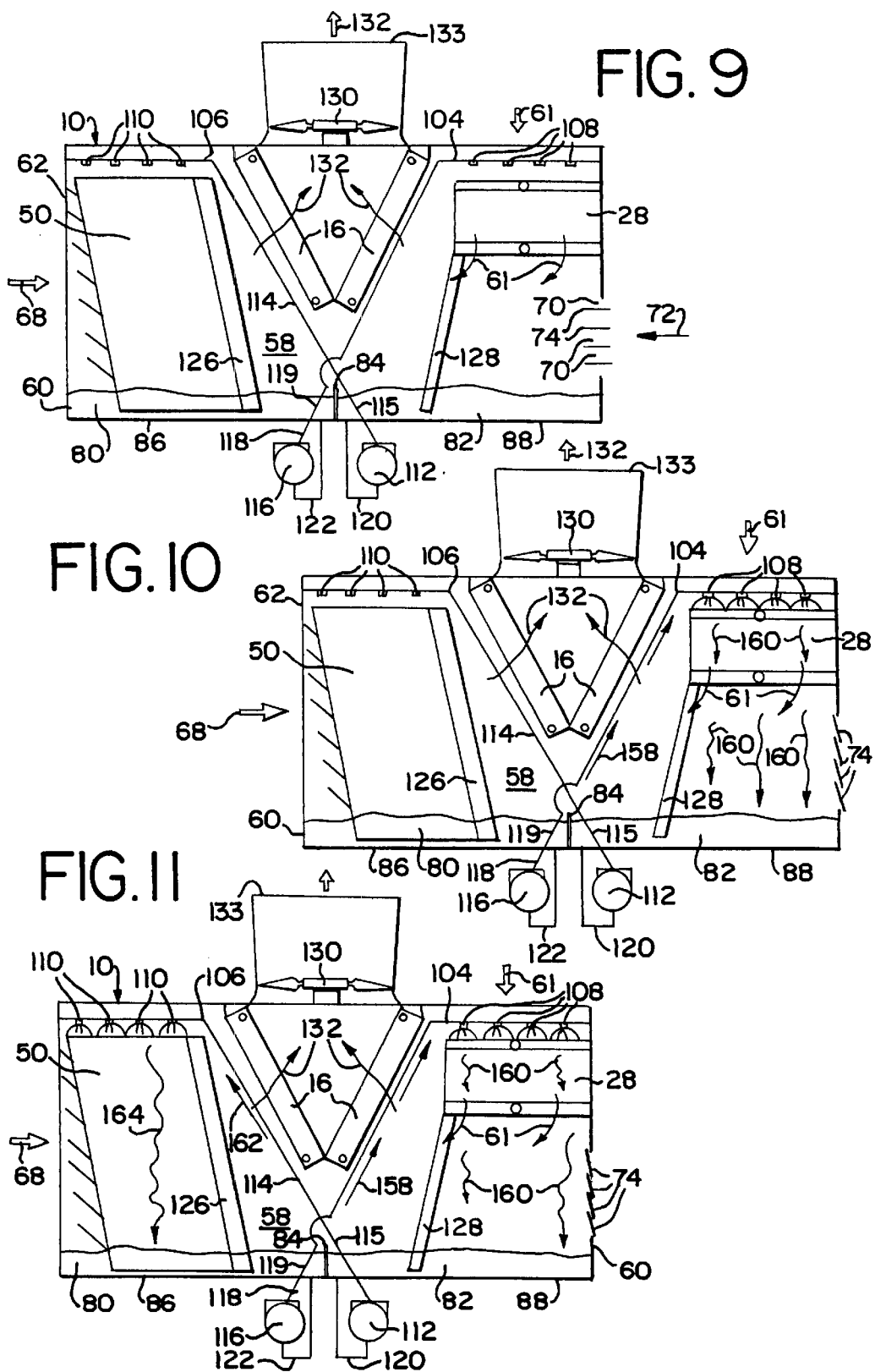

METHOD OF OPERATING LOW PROFILE HEAT EXCHANGE METHOD WITH REDUCED WATER CONSUMPTION

This is a division of U.S. patent application Ser. No. 09/265,504, filed on Mar. 8, 1999 by Thomas P. Carter and Branislav Korenic now U.S. Pat. No. 6,213,200.

BACKGROUND OF THE INVENTION

1. Field of the Invention

The present invention relates to heat exchangers, and more particularly to closed circuit evaporative heat exchanger systems and combined direct and indirect closed circuit evaporative heat exchange systems.

2. Description of the Prior Art

Waste heat may be rejected to the atmosphere by dry or sensible heat exchangers. In a dry or sensible heat exchanger, there are two fluids: an air stream and a process fluid stream. In a closed system, the process fluid stream is enclosed so that there is no direct contact between the air stream and the process fluid stream; the process fluid stream is not open to the atmosphere. The enclosing structure may be a coil of tubes. Sensible heat is exchanged as the air stream is passed over the structure enclosing the process fluid stream. In the art these structures are known as "compact heat exchangers."

In most climates, evaporative heat exchangers offer significant process efficiency improvements over dry heat exchangers. One type of evaporative heat exchanger is a direct evaporative heat exchanger. In a direct heat exchanger, only an air stream and an evaporative liquid stream are involved; the evaporative liquid stream is usually water, and the two streams come into direct contact with each other.

Another type of evaporative heat exchanger is an indirect closed circuit evaporative heat exchanger, where three fluid streams are involved: an air stream, an evaporative liquid stream, and an enclosed process fluid stream. The enclosed fluid stream first exchanges sensible heat with the evaporative liquid through indirect heat transfer, since it does not directly contact the evaporative liquid and then the air stream and the evaporative liquid exchange heat and mass when they contact each other.

Another type of evaporative heat exchanger is a combined direct and indirect closed circuit evaporative heat exchanger. Examples of combined systems are disclosed in U.S. Pat. Nos. 5,435,382 (1995) and 5,816,318 (1998) to Carter.

Both dry and evaporative heat exchangers are commonly used to reject heat as coolers or condensers. Evaporative coolers reject heat at temperatures approaching the lower ambient wet bulb temperatures, while dry coolers are limited to approaching the higher ambient dry bulb temperatures. In many climates the ambient wet bulb temperature is often 20 to 30° F. below the ambient design dry bulb temperature. Thus, in an evaporative cooler, the evaporative liquid stream may reach a temperature significantly lower than the ambient dry bulb temperature, offering the opportunity to increase the efficiency of the cooling process and to lower the overall process energy requirements. In spite of these opportunities to increase process efficiencies and lower overall process energy requirements, evaporative cooling is often not used due to concern about water consumption from evaporation of the evaporative liquid and freezing potentials during cold weather operation.

In addition, both sensible and evaporative heat exchangers are typically sized to perform their required heat rejection duty at times of greatest thermal difficulty. This design condition is typically expressed as the summer design wet bulb or dry bulb temperature. While it is often critical that the heat rejection equipment be able to reject the required amount of heat at these design conditions, the duration of these elevated atmospheric temperatures may account for as little as 1% of the hours of operation of the equipment. The remainder of the time, the equipment may have more capacity than required, resulting in the waste of energy and evaporative liquid.

It is also desirable that the overall height of evaporative cooling towers be limited, so that the cooling towers may be used in spaces with limited clearance, and so that the pump used for the evaporative liquid has a reduced pumping head.

SUMMARY OF THE INVENTION

The present invention is directed toward providing a heat exchange method that has the efficiencies of an evaporative heat exchange method while conserving evaporative liquid.

BRIEF DESCRIPTION OF THE DRAWINGS

In the following drawings, like reference numbers are used for like parts and:

FIG. 9 is a schematic view of the heat exchange apparatus of FIG. 1 shown in a first mode of operation;

FIG. 10 is a schematic view of the heat exchange apparatus of FIG. 1 shown in a second mode of operation; and FIG. 11 is a schematic view of the heat exchange apparatus of FIG. 1 shown in a third mode of operation.

DETAILED DESCRIPTION

Figure 1:
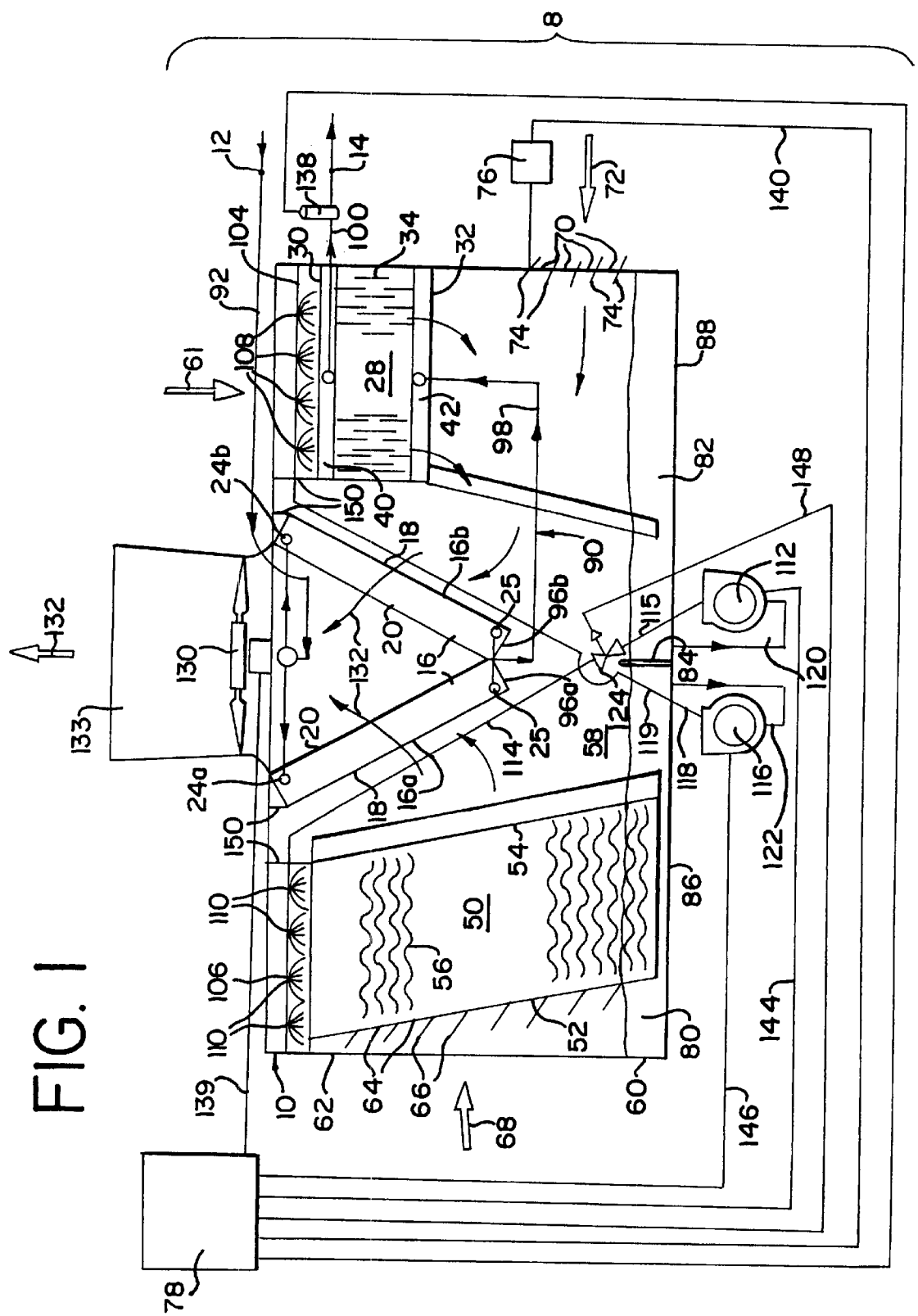
FIG. 1 is a side view of a closed circuit heat exchange system, with parts shown in schematic and with part of the housing removed to illustrate the interior of the exchange system.

A first embodiment of a heat exchange system 8 for extracting heat from a process fluid is illustrated in FIG. 1. The system 8 includes a heat exchange apparatus 10 with a process fluid inlet 12 connected to receive process fluid from an external device (not shown) such as manufacturing process equipment. After heat is rejected from the process fluid, the process fluid exits through a process fluid outlet 14.

Figure 2:
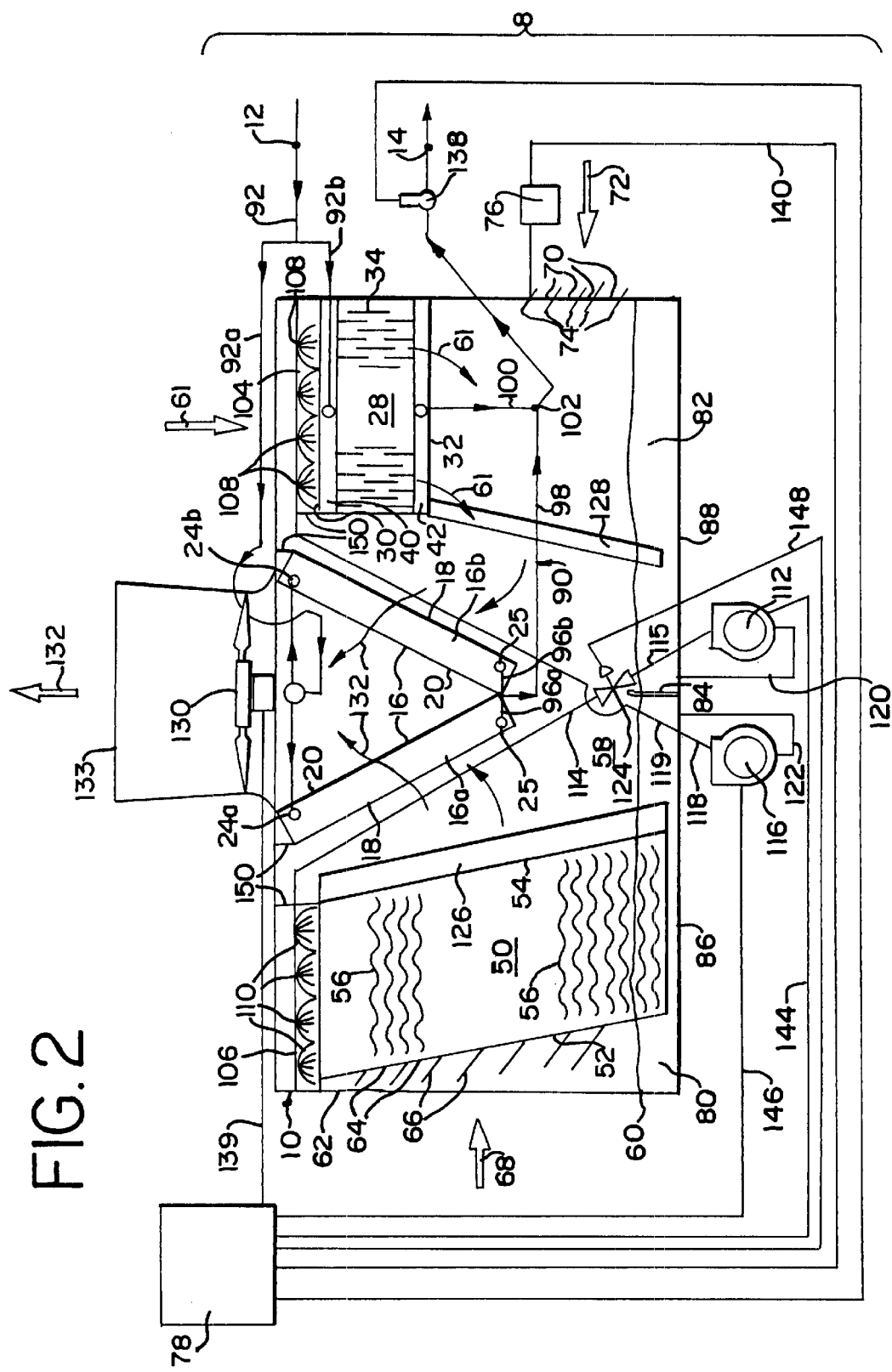
FIG. 2 is a side view of a second embodiment of a closed circuit heat exchanger, with parts shown in schematic and with part of the housing removed to illustrate the interior of the heat exchanger.

The process fluid may comprise, for example, a single-phase liquid, such as water, that is received through the inlet 12 at one temperature and discharged through the outlet 14 at a lower temperature. Alternatively, the process fluid may comprise a single-phase gas that is received through the inlet 12 at one temperature and discharged through the outlet 14 at a lower temperature. Thus, the heat exchange system may comprise a fluid cooling system. A fluid cooling system is illustrated in FIG. 1. The heat exchange system 8 may also comprise a condensing system, in which case the process fluid may comprise a two-phase or a multi-phase fluid at the inlet 12 that is discharged as a single phase liquid or a mixture of liquid and gas for a multi-phase fluid, from the outlet 14. A fluid condensing system is illustrated in FIG. 2. It should be understood that these examples of process fluids are provided for purposes of illustration only, and that the invention is not limited to any particular type or phase of process fluid unless expressly set forth in the claims.

The illustrated heat exchange apparatus 10 is a closed circuit heat exchanger. The process fluid is enclosed between the inlet 12 and outlet 14 so that there is no exposure of the process fluid to the atmosphere, and no direct contact between the process fluid stream and any stream of air or evaporative liquid within the apparatus 10.

The heat exchange systems 8 of FIGS. 1 and 2 illustrate various elements within the confines of the heat exchange apparatuses 10, and outside of the heat exchange apparatuses. It should be understood that the various elements of the system described hereinafter can be positioned within or outside the heat exchange apparatus unless otherwise described. As used herein and in the claims, the expression "heat exchange system" should be interpreted broadly to include both heat exchange apparatuses that enclose the features within the confines of the apparatus and heat exchange systems that include some of the elements within a heat exchange apparatus and some of the elements outside of the apparatus, and heat exchange systems that use more than one heat exchange apparatus; reference number 8 is used herein to refer to the heat exchange system, generally.

Figure 6:
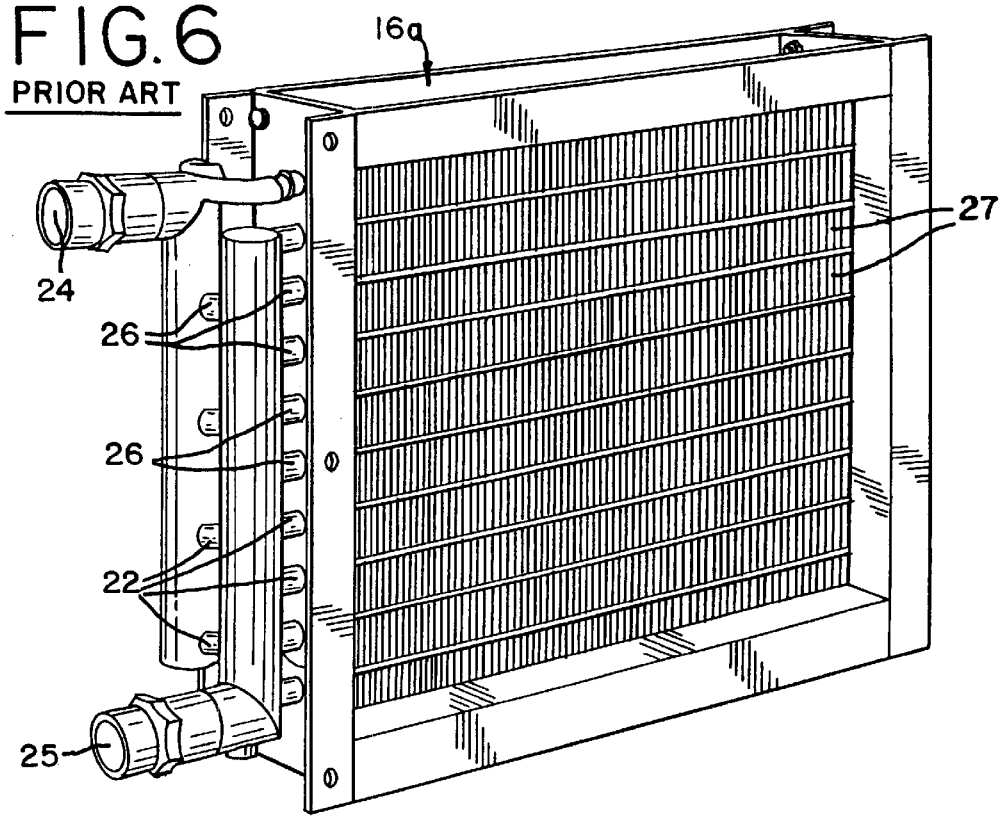
FIG. 6 is a perspective view of a dry indirect contact heat exchange device, or compact heat exchanger, that may be used in the closed circuit heat exchanger of the present invention.

The heat exchange systems of both embodiments of FIGS. 1 and 2 include a dry indirect contact heat exchange section 16. This dry section 16 has an air inlet side 18, an air outlet side 20 and a process fluid circuit shown generally at 22 in FIG. 6. As shown in FIGS. 1–2, the dry indirect contact heat exchange section 16 is comprised of two identical heat exchangers 16a, 16b connected in parallel to an inlet conduit 92 to receive process fluid from the process fluid inlet 12. One of the identical heat exchangers 16a is shown in FIG. 6. In the illustrated embodiments, the dry indirect contact heat exchange section 16 is within the heat exchange apparatus 10.

As shown in FIG. 6, each illustrated fluid circuit 22 includes an inlet header 24, outlet header 25, and a plurality of tubes 26, each tube having a plurality of fins 27 connected to the outside of the tube. The dry indirect contact heat exchange section 16 may comprise a commercially available externally finned heat transfer coil sold by Super Radiator Coils of Richmond, Va. as part 48×69-6R-5CW-L-R, with ⅝ in.×0.020 in. wall copper tubes and 0.008 in. aluminum fins (flat), with 24 circuits, illustrated in FIG. 6. It should be understood that this heat transfer coil is identified for purposes of illustration only, and the invention is not limited to this particular heat transfer coil. Two or more of such commercially available coils may be connected in series or in parallel to comprise the dry indirect contact heat exchange section 16. FIG. 1 shows two such coils in a parallel arrangement and centered in a V-shaped configuration in the center of the heat exchange apparatus 10. The combination of coils may vary with product size.

It should be understood that other externally finned structures could be used, such as tubes with external spiral wrapped fins, or any other combination classified as "compact heat exchangers"; the structure shown for the dry indirect contact heat exchange section is provided by way of example only. For a heat exchange system such as that shown in FIG. 1, for example, it may be desirable to structure the dry heat exchange coils to optimize the pressure drop across the coils. For example, the face area of the dry indirect contact heat exchange section may be optimized with the air flow to provide economical and efficient operation. Any suitable commercially available type of coil arrangement with external or internal fins or both could be used, such as coils with circular or corrugated fins, for example, as well as any other type of heat exchanger that operates in the dry mode, although the heat exchanger should be structured so that the pressure drop is not excessive. The external fins are expected to increase the efficiency of operation of the dry indirect contact heat exchange section 16 at a minimum necessary air-side pressure drop.

Figure 3:
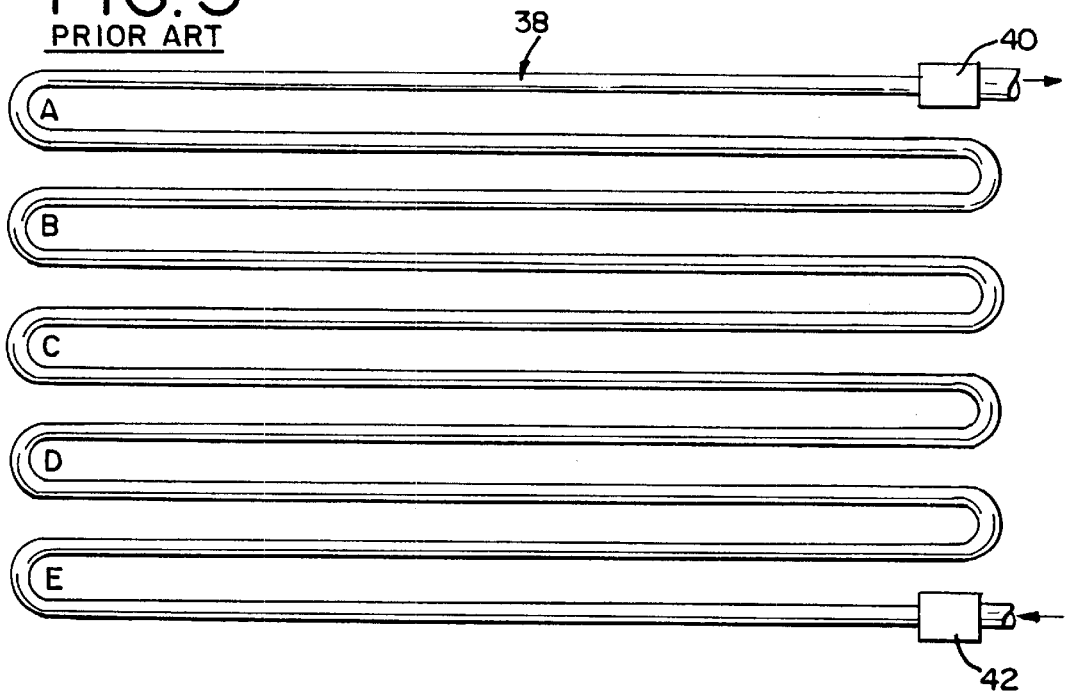
FIG. 3 is a front view of a single serpentine shaped circuit that may be used in the second indirect contact heat exchange section of the heat exchanger of the present invention.
Figure 4:
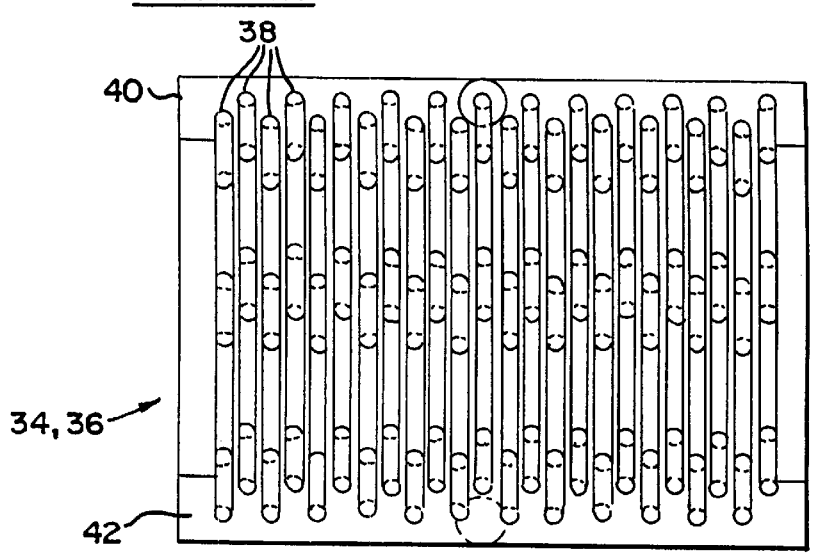
FIG. 4 is a side view of the second indirect contact heat exchange section that may be used in the heat exchanger of the present invention.
Figure 5:
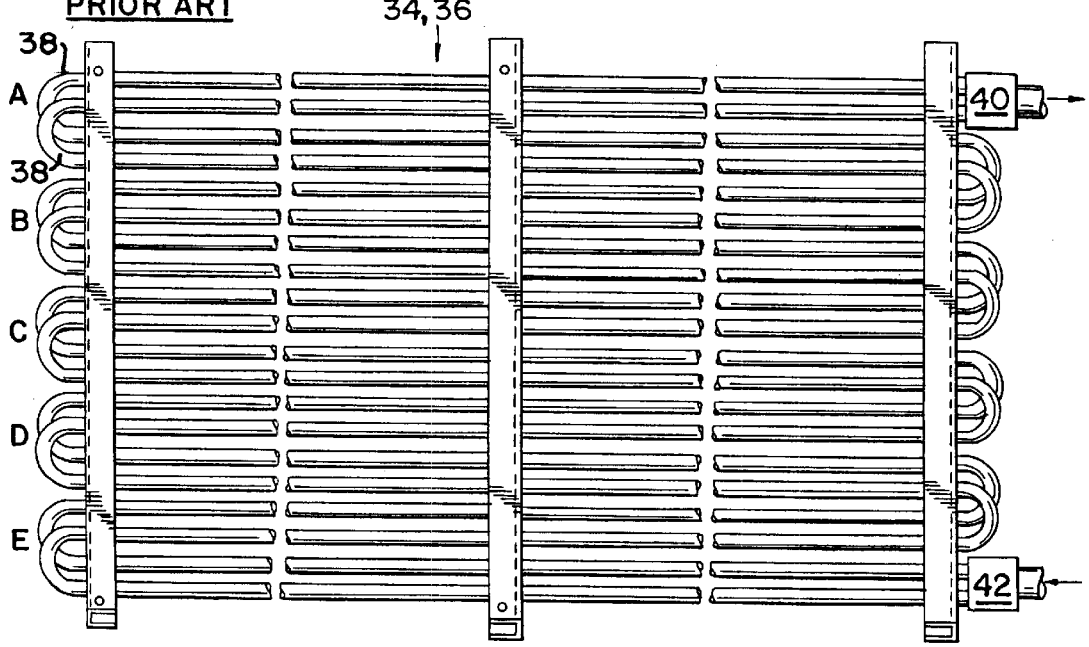
FIG. 5 is a front view of the second indirect contact heat exchange section showing the staggered relationship between adjacent circuits and arrangement of the inlet and outlet headers.

To supplement the dry indirect contact heat exchange section 16, the embodiments of FIGS. 1–2 each include a second indirect contact heat exchange section 28 that is selectively operable for either dry or evaporative heat exchange. Although one such section is described below, it should be understood that the following description applies to both embodiments. In the illustrated embodiments, the second indirect contact heat exchange section 28 is housed within the heat exchange apparatus 10. The second indirect contact heat exchange section 28 includes an air inlet side 30, an air outlet side 32, and a process fluid circuit 34. The process fluid circuit 34 of the illustrated second indirect contact heat exchange section 28 comprises a single coil assembly 36 of the type described and shown in U.S. Pat. Nos. 5,435,382 and 5,816,318, and shown in FIGS. 3–5 of the present application. The coil assembly 36 has a generally rectangular shape with a series of horizontal closely spaced parallel circuits 38 of serpentine shape. All of the circuits 38 have a top end connected to a top fluid header 40 and a bottom end connected to a bottom fluid header 42. In the first illustrated embodiment, the bottom fluid header 42 comprises the inlet header and the top fluid header 40 comprises the outlet header when the apparatus is used as a fluid cooler. The inlet and outlet headers 42, 40 are reversed in the condenser shown in FIG. 2, so that the top fluid header 40 comprises the inlet header and the bottom fluid header 42 comprises the outlet header. Together, the headers 40, 42 and serpentine circuits 38 comprise the process fluid circuit 34 of the second indirect contact heat exchange section 28.

As disclosed in U.S. Pat. Nos. 5,435,382 and 5,816,318 and shown in FIGS. 3–5, each individual circuit 38 within the coil assembly 36 consists of a single, continuous length of coil tubing that is subjected to a bending operation which forms the tubing into several U-shaped rows A–E, that are in a vertical and equally-spaced relationship from each other thereby providing each circuit 38 with a resultant serpentine shape.

The second indirect contact heat exchange section 28 may comprise those used in the commercially-available Series 1500 Closed Circuit Cooling Towers and Series 1500 Evaporative Condensers available from Baltimore Aircoil Company of Baltimore, Md. It should be understood that other structures may be used for the second indirect contact heat exchange section 28. For example, the tubes of the coils could be externally finned for more efficient heat transfer when operated in the dry mode, or the tubes may be internally finned with microfins or other similar arrangements known in the art.

As shown in FIGS. 1–2, each heat exchange system 8 also includes a direct contact heat exchange section 50 having an air inlet side 52, an air outlet side 54, and fill media 56. In the illustrated embodiments, the direct contact heat exchange section 50 is within the heat exchange apparatus 10; the air inlet side 52 is positioned so that ambient air may be drawn into the apparatus 10, and the air outlet side 54 opens into a plenum 58. The plenum 58 also receives air from the outlet side 32 of the second indirect contact heat exchange section 28. The fill media 56 in the direct contact heat exchange section 50 may be any standard fill media, such as plastic fill, as well as wood or ceramic fill media, or any other fill media known in the art. The fill media may be that disclosed in U.S. Pat. No. 4,361,426 (1982), for example. Commercially available cross flow PVC fill, such as "Accu-PAC CF 1900 Cooling Tower Film" fill available from Brentwood Industries of Reading, Pa., may also be used.

Figure 7:
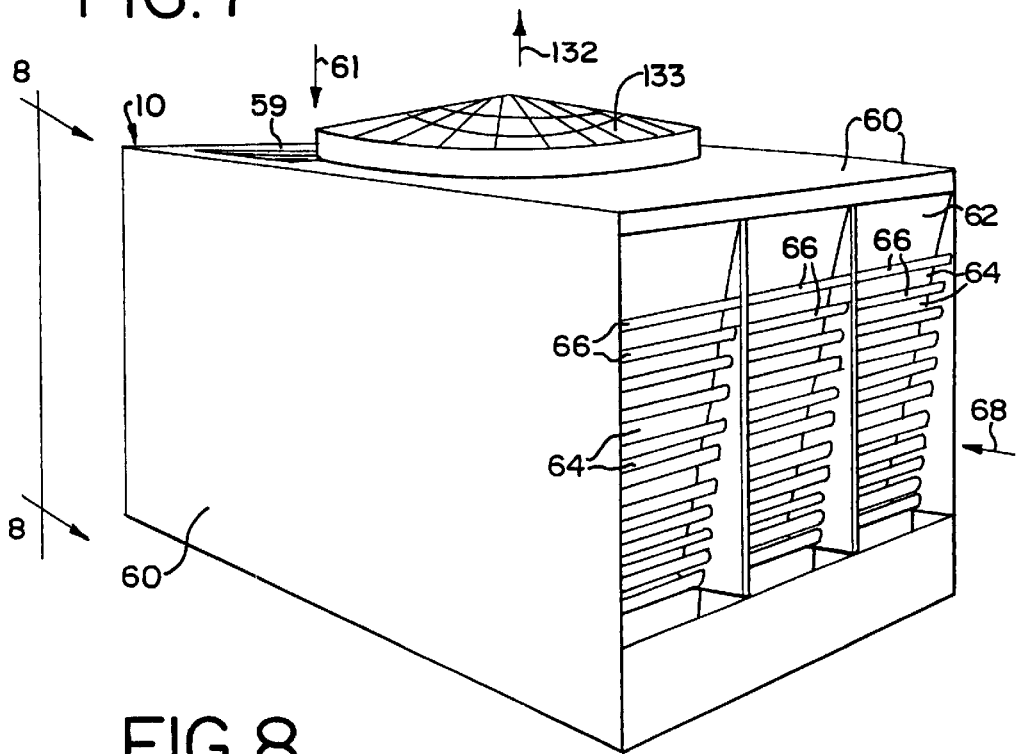
FIG. 7 is a perspective view of the exterior of a heat exchange apparatus such as those shown in FIGS. 1–2.
Figure 8:
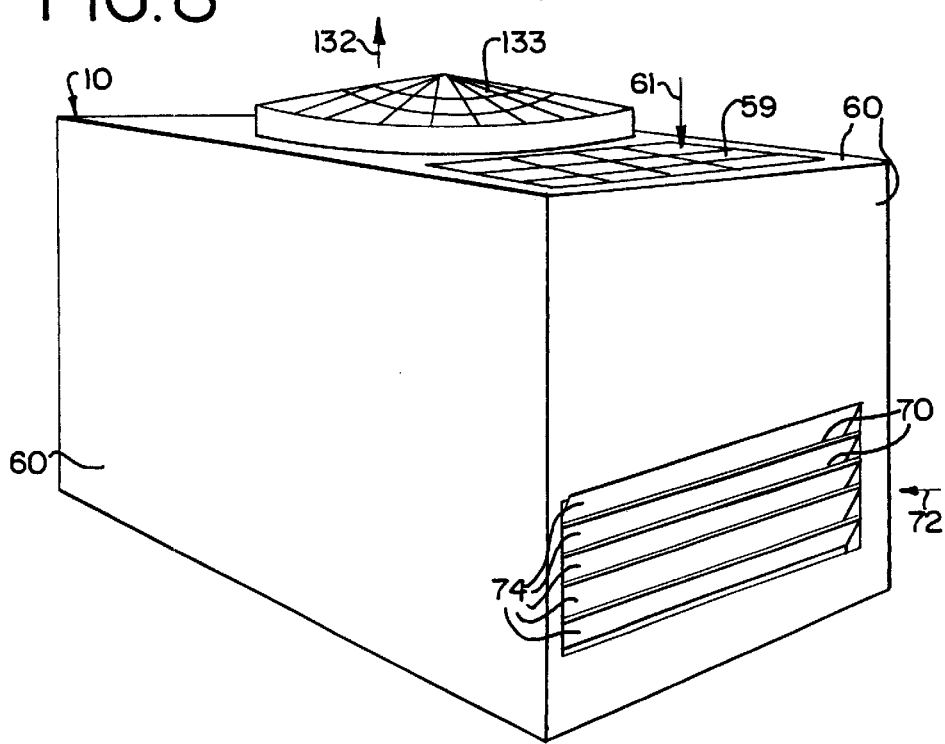
FIG. 8 is a perspective view of the exterior of the heat exchange apparatus of FIG. 7, along line 8—8 of FIG. 7.

In the illustrated embodiments, the apparatus has a housing 60 that encloses the dry indirect contact heat exchange section 16, the second indirect contact heat exchange section 28 and the direct contact heat exchange section 50. The housing 60 may be made of any suitable material, such as steel sheet or fiber reinforced resin material, or parts could be made of each material. As shown in FIGS. 7–8, the top of the housing has one or more openings 59 to admit ambient air into the second indirect contact heat exchange section 28. These top openings 59 may be covered by protective screening or grating. An ambient air stream 61 may enter the heat exchange apparatus 10 through the openings 59 in the top and then enter and flow through the second indirect contact heat exchange section 28. As shown in FIGS. 1–2 and 7, one side wall 62 has openings 64 with louvers 66 or a protective grate at the openings 64. Thus, another ambient air stream 68 may enter the heat exchange apparatus through the openings 64 and enter and flow through the direct contact heat exchange section 50. As shown in FIGS. 1–2, 8 and 9–11, each illustrated housing 60 also includes auxiliary openings 70 that provide an inlet for another ambient air stream 72 into the plenum 58 without first passing through either the second indirect contact heat exchange section 28 or direct contact heat exchange section 50. Dampers 74 may be provided for selectively closing the auxiliary air openings 70. The dampers 74 may be connected to one or more servo motors of any standard type, shown generally at 76 in FIGS. 1–2, and the motors 76 may be connected to a control mechanism such as a central logic element 78 or other control device so that the dampers 74 may be automatically opened and closed depending on, for example, the temperature of the process fluid downstream of the dry indirect contact heat exchange section 16, or some other factor. The dampers 74 need not be motorized but could be manually operable as well.

Each illustrated heat exchange apparatus 10 also includes a direct section sump 80 and an indirect section sump 82. The direct section sump 80 is positioned below the fill media 56 and the indirect section sump 82 is positioned below the second indirect contact heat exchange section 28. The two sumps 80, 82 are both enclosed within the housing 60 and are separated by a low wall 84 so that the sumps are separated from each other. The low wall 84 is lower than the other walls of both sumps so that the evaporative liquid can flow from one sump to the other in the event the flows on the two pumps are not equal. The flows are unequal by design when the flow to the direct contact heat exchange section is either modulated or off, as described below.

In the illustrated embodiments, the direct contact heat exchange section 50 and its sump 80 are positioned on one side 86 of the heat exchange apparatus 10 and the second indirect contact heat exchange section 28 and its sump 82 are positioned on the other side 88 of the heat exchange apparatus. The plenum 58 and the dry indirect contact heat exchange section 16 are positioned between the direct contact heat exchange section 50 and the second indirect contact heat exchange section 28. The air intake side 18 of the dry indirect contact heat exchange section 16 is within the plenum 58, and the two dry indirect contact heat exchange sections 16a, 16b are supported to be spaced above the sumps 80, 82.

In each illustrated embodiment, the heat exchange systems 8 also include process fluid flow paths 90 that connect the process fluid inlets 12, the dry indirect contact heat exchange section process fluid circuit 22, the second indirect contact heat exchange section process fluid circuit 34 and the process fluid outlet 14. In both illustrated embodiments, the flow paths 90 are within the heat exchange apparatuses 10.

In the fluid cooler embodiment of FIG. 1, the flow path 90 includes an inlet conduit 92 that is connected to the process fluid inlet 12 and branches to connect to inlet headers 24a, 24b for each of the dry indirect section heat exchangers 16a, 16b. The process fluid flows in parallel through the two dry indirect section heat exchangers 16a, 16b, and exits through outlets 96a, 96b to an intermediate conduit 98. The intermediate conduit 98 leads and is connected to the bottom fluid header 42 of the second indirect contact heat exchange section 28. The process fluid enters the bottom fluid header 42, flows upward to the top fluid header 40, and enters a discharge conduit 100 that is connected to the process fluid outlet 14.

In the fluid condenser embodiment of FIG. 2, the process fluid enters the inlet conduit 92, which then splits into two branches 92a, 92b. One branch 92a branches again and connect to inlet headers 24a, 24b for each of the dry indirect section heat exchangers 16a, 16b. The process fluid flows in parallel through the two dry indirect section heat exchangers 16a, 16b, and exits through outlet conduits 96a, 96b to an intermediate conduit 98. The other branch 92b of the inlet conduit leads and is connected to the top fluid header 40 of the second indirect contact heat exchange section fluid circuit 34. The process fluid enters the top fluid header 40, flows downward to the bottom fluid header 40, and enters a discharge conduit 100. The discharge conduit also joins the intermediate conduit 98 at a juncture 102 upstream of the process fluid outlet 14 so that the two parallel streams of process fluid are joined upstream of the process fluid outlet 14.

In both the embodiments of FIGS. 1–2, the process fluid flow paths 90 provide for substantially continuous flow of process fluid through both the dry indirect contact heat exchange section 16 and the second indirect contact heat exchange section 28. In other words, all process fluid that enters the heat exchange system 8 flows through both the dry indirect contact heat exchange section 16 and the second indirect contact heat exchange section 28 before exiting the system through the fluid outlet 14. There are no valves to limit or block process fluid flow from either indirect contact heat exchange section 16, 28. It should be understood that in a condenser, the mass flow rate of the process fluid to each section will not be constant but will fluctuate, in a selfregulating manner, with the capacity of the heat exchange section to reject heat.

As shown in FIGS. 1–2, each heat exchange system 8 also includes an indirect section distribution system 104 for selectively distributing evaporative liquid to the second indirect contact heat exchange section 28 for selective dry and evaporative heat exchange in the second indirect contact heat exchange section. In both embodiments, the indirect section distribution system 104 is within the heat exchange apparatus 10. Each heat exchange system also includes a separate and independent direct section distribution system 106 for selectively distributing evaporative liquid to the direct contact heat exchange section 50. In both embodiments, the direct section distribution system is within the heat exchange apparatus 10.

In both illustrated embodiments, the indirect section distribution system 104 includes a plurality of indirect section evaporative liquid outlets 108 disposed above the second indirect contact heat exchange section 28. In both embodiments, the direct section distribution system 106 includes a plurality of direct section evaporative liquid outlets 110 positioned to distribute evaporative liquid over the direct contact heat exchange section 50. The direct section and indirect section evaporative liquid outlets 108, 110 comprise spray nozzles in the illustrated embodiments. The evaporative liquid is typically water.

In each illustrated embodiment, the direct section evaporative liquid distribution system 106 includes a first pump 112 and a first evaporative liquid flow path 114 connected between the indirect section sump 82 and the direct section evaporative liquid outlets 110. The first pump 112 moves evaporative liquid from the indirect section sump 82 through the flow path 114 to the direct section evaporative liquid spray outlets 110. Thus, evaporative liquid collected from the second indirect contact heat exchange section 28 may be selectively distributed over the fill media 56 for evaporative heat exchange with the air stream 68 in the direct contact heat exchange section 50. The flow path 114 includes conduits 115 connected between the pump 112 and the outlets 110, and a drain conduit 120 that leads from a drain in the indirect section sump 82 to the first pump 112.

In each illustrated embodiment, the indirect section evaporative liquid distribution system 104 includes a second pump 116 and a second evaporative liquid flow path 118 connected between the direct section sump 80 and the indirect section evaporative liquid outlets 108. The second pump 116 moves evaporative liquid from the direct section sump 80 through the second flow path 118 to the indirect section evaporative liquid outlets 108. Thus, evaporative liquid may be selectively distributed over the second indirect contact heat exchange section 28. The flow path 118 includes conduits 119 connected between the second pump 116 and the outlets 108, and a drain conduit 122 that leads from a drain in the direct section sump 80 to the second pump 116. In both illustrated embodiments, the pumps 112, 116 and flow paths 114, 118 are within the heat exchange apparatuses 10.

The second pump 116 preferably comprises a constant speed pump that is turned on and off at selected times for selective operation of the second indirect contact heat exchange section 28 as a dry heat exchanger or as an evaporative heat exchanger. The first pump 112 may comprise a variable speed pump, so that the quantity of evaporative liquid distributed over the direct section fill media 56 may be varied, depending upon conditions. The first pump 112 can also be turned off so that no evaporative liquid is distributed over the direct contact heat exchange section 50. Alternatively, the first pump 112 may comprise a constant speed pump, and a valve 124 may be incorporated into the first evaporative liquid flow path 114 for control of the flow of evaporative liquid to the direct section evaporative liquid outlets 110.

To prevent evaporative liquid droplets from being carried out of the second indirect contact and direct contact heat exchange sections 28, 50 into the plenum 58, standard structures, such as drift eliminators 126, 128 are positioned between the air outlet sides 32, 54 of the second indirect and direct contact heat exchange sections 28, 50 and the plenum 58. The drift eliminators 126, 128 may comprise closely spaced metal, plastic or wood slats or louvers, which permit air flow therethrough but will collect the fine water droplets in the air. Other standard devices may also be used with the present invention.

Each of the two illustrated heat exchange systems 8 also includes an air moving device 130 for moving the air streams 61, 68 through the second indirect contact heat exchange section 28 and the direct contact heat exchange section 50 and into and through the dry indirect contact heat exchange section 16. In the illustrated embodiments, the air moving devices 130 are within the heat exchange apparatuses 10. In each embodiment, the air moving device 130 is also used to move the auxiliary air stream 72 into the plenum 58. In the plenum 58, all of the ambient air streams 61, 68 and 72 are combined into the single air stream 132 that is moved into and through the dry indirect contact heat exchange section 16. The air moving devices 130 comprise motorized fans. In the illustrated embodiments, the motorized fans are within the housing 60, upstream of the dry indirect contact heat exchange section 16, the second indirect contact heat exchange section 28, the direct contact heat exchange section 50 and the auxiliary openings 70 and dampers 74. Thus, the motorized fan induces drafts to draw the air streams 61, 68 and 72 into the plenum 58 and then draws the combined air stream 132 into and through the dry indirect contact heat exchange section 16 and pushes the combined air stream 132 out through an opening 133 in the top of the apparatus 10. If the dampers 74 are closed, the combined air stream 132 would consist of the air streams 61 and 68 received in the plenum 58 from the second indirect contact heat exchange section 28 and the direct contact heat exchange section 50. The motorized fan is preferably either a two speed fan or a variable speed fan for energy efficiency.

To maximize efficiency and conservation of the evaporative liquid, the illustrated heat exchange systems 8 each include a controller, shown at 78 in FIGS. 1–2. The controller 78 comprises a computer or programmable logic element that may be part of the heat exchange apparatus 10, a stand alone computer connected to the heat exchange apparatus 10, or part of an overall computerized plant control system that is connected to the heat exchange apparatus 10. The controller 78 receives input from at least one input mechanism 138, shown schematically in FIGS. 1–2. The input mechanism 138 could allow for manual input of data or for operator control of the system, or could be a sensor such as a temperature or pressure sensor. If the input mechanism 138 comprises a temperature sensor, the temperature sensed may comprise the ambient air temperature, for example, or the temperature of the process fluid. In FIG. 1 the input mechanism 138 is connected in the discharge conduit 100; in the FIG. 2 embodiment, the temperature sensor is downstream of the juncture 102 of the discharge conduit 100 and intermediate conduit 98. Thus, the illustrated temperature sensor 138 may sense the temperature of the process fluid exiting the system, after the fluid has been cooled or condensed, and provide this data to the controller 78 for adjustments to the system as described below. The temperature sensor 138 may comprise, for example, a SET189A Series Temperature Sensor, available from Johnson Controls, Inc. of Milwaukee, Wis., with necessary hardware for pipe mounting. It should be understood that this device is identified for purposes of illustration only, and that the invention is not limited to this device unless expressly set forth in the claims. Other similar temperature sensors from any other major controls manufacturer may be used as well.

It should be understood that other physical characteristics or properties of the process fluid could be sensed, such as process fluid pressure. Thus, the sensor 138 may comprise a pressure sensor. It should also be understood that several input mechanisms could be used together. For example, it may be desirable to input both the process fluid temperature and the ambient temperature, and it may be desirable to allow input for operator override of automatic operation of the system.

Various outputs from the controller 78 may be used to maximize efficiency and conservation of the evaporative liquid. As illustrated in FIGS. 1–2, the system may have one output 139 connected to control operation of the fan motor. Thus, the speed of the fan 130 may be changed based upon either the ambient temperature or process fluid temperature, for example. There may be another output 140 from the controller 78 to the motor 76 connected to open and close the dampers 74 at the auxiliary openings 70 in the housing, or to move the dampers 74 to intermediate positions. There are also outputs 144, 146 to the first and second pumps 112, 116 so that operation of the pumps may be controlled based upon ambient or process fluid conditions. If a valve 124 is used, there may be an additional output 148 from the controller to a servo mechanism for the valve, for adjusting the flow rate of evaporative liquid to the direct contact heat exchange section 50. Feedback may also be provided to the controller from each of the controlled elements.

One example of a suitable programmable logic element 78 is the System 350 A350P Electronic Proportional Plus Integral Temperature Control available from Johnson Controls, Inc. of Milwaukee, Wis. The programmable logic element could alternatively be incorporated into the overall plant control system. In either event, it is expected that a person skilled in the art of controller design, selection and implementation would be consulted for optimal results in selecting and implementing a suitable programmable logic element.

Operation of the illustrated heat exchange systems 8 may be as follows. Operation of one system will be described, but it should be understood that the following description applies to the other system as well, except where any distinction is expressly made. In a first mode of operation, shown schematically in FIG. 9, at a predetermined range of ambient dry bulb temperatures, such as 15° C. (59° F.) and below, the heat exchange system 8 operates in a dry mode. Both pumps 112, 116 are off, and no evaporative liquid flows: the second indirect contact heat exchange section 28 operates in the dry mode, and the direct contact heat exchange section 50 carries no heat load. The dampers 74 are fully open, and the auxiliary air stream 72 flows into the plenum 58. Air flow through the direct and second indirect contact heat exchange sections 50, 28 is minimized, and the air flow through the dry indirect contact heat exchange section 16 is maximized. The process fluid flows through both the dry indirect contact heat exchange section 16 and the second indirect contact heat exchange section 28. The dry indirect contact heat exchange section 16 is the primary source of heat extraction in this mode.

When the air temperature exceeds the preset cut-off air temperature of 15° C. (59° F.), the heat exchange system 8 will not be able to cool the process fluid to the desired output temperature Tfo or pressure Pfo. The heat exchange system enters a second mode of operation, shown schematically in FIG. 10. The controller activates the second pump 116 so that evaporative liquid is moved through the second flow path 118 of the indirect section distribution system 104, as shown at 158 in FIG. 10, and discharged through the indirect section outlets 108 over the second indirect contact heat exchange section 28. The evaporative liquid dripping or flowing through the second indirect contact heat exchange section 28 is shown at 160 in FIG. 10. The evaporative liquid collects in the indirect section sump 82, overflows the low wall 84 and flows into the direct section sump 80. From the direct section sump, the evaporative liquid can be redistributed to over the second indirect contact heat exchange section 28. The process fluid flows through both the dry and second indirect contact heat exchange sections 16, 28. The dampers 74 are closed so that there is no auxiliary air stream; instead, the ambient air streams 61, 68 from the second indirect and direct contact heat exchange sections merge in the plenum 58 and then enter the dry indirect contact heat exchange section 16 as the air stream 132. The heat extraction from the process fluid performed by the second indirect section 28 increases, and the discharge process fluid temperature Tfo or pressure Pfo is brought back to the preset value. The direct contact heat exchange section 50 carries no heat load in this mode; the first pump 112 remains inactive.

As the outside ambient air temperature further increases, the first spray pump 112 is activated to engage the third mode of operation, shown schematically in FIG. 11. The first spray pump 112 moves evaporative liquid from the indirect section sump 82 through the flow path 114 of the direct section distribution system 106, as shown at 162 in FIG. 11, and the evaporative liquid is discharged over the fill media 56 as shown at 164 in FIG. 11. As the evaporative liquid drips or flows through the fill media, it transfers heat and mass to the air stream 68, and the evaporative liquid is cooled before it falls to the direct section sump 80 below the fill media 56. The cooled evaporative liquid in the direct section sump 80 is then pumped by the second pump 116 through the flow path 118 to the evaporative liquid outlets 108 where the cooled evaporative liquid is distributed over the second indirect contact heat exchange section 28, as shown at 160.

In the third mode of operation, the evaporative liquid cooling in the direct contact heat exchange section 50 acts to regulate heat extraction in the second indirect contact heat exchange section, and some quantity of evaporative liquid is lost to evaporation. Accordingly, to conserve evaporative liquid, the present invention modulates the flow of evaporative liquid to the direct contact heat exchange section 50 so that an efficient flow rate is maintained for cooling the evaporative liquid and the process fluid. However, an excessive flow rate is avoided to avoid unnecessary losses due to evaporation of the evaporative liquid. Generally, the higher the outside air wet bulb temperature, the greater the volume of evaporative liquid discharged over the direct contact heat exchange section 50. Similarly, if the flow rate is made to depend on the discharge process fluid temperature or pressure, the greater discrepancy between the measured Tfo or Pfo and the preset Tfo or Pfo, the greater the flow rate of evaporative liquid to the direct section 50; as the measured Tfo or Pfo approaches preset Tfo or Pfo, the flow rate of evaporative liquid will decrease.

The evaporative liquid flow rate is preferably controlled by the controller 78, so that the flow rate to the direct contact heat exchange section 50 is a function of some measured parameter, such as the ambient air temperature or a physical characteristic or property of the process fluid. The flow rate is regulated through control of either the variable speed pump 112, or if a constant speed pump is used, through control of the motorized valve 124. The flow rate of evaporative liquid could be operator controlled based upon a temperature reading or pressure reading taken by the operator at the process fluid outlet 14, or could be operator controlled based upon ambient temperature readings. However, automatic operation would be preferred for optimal performance.

If the evaporative liquid flow rate to the direct contact heat exchange section is substantially less than the evaporative liquid flow rate to the indirect contact heat exchange section, the low wall 84 allows collected evaporative liquid to overflow the indirect section sump 82 and flow into the direct section sump 80.

The present invention utilizes features disclosed in a United States Patent Application filed on the same day herewith, entitled "CLOSED CIRCUIT HEAT EXCHANGE SYSTEM AND METHOD WITH REDUCED WATER CONSUMPTION" by Branislav Korenic and Thomas P. Carter, and assigned to Baltimore Aircoil Company, Inc., the complete disclosure of which is incorporated by reference herein in its entirety. However, unlike the heat exchange systems shown in FIGS. 1, 4–6 and 11–12 in that patent application, the heat exchange systems of the present application do not provide for adiabatic saturation of the air streams, and operate with independent control over the evaporative liquid flow over the second indirect contact heat exchange section and direct contact heat exchange section.

The heat exchange systems 8 of the present invention may include other features. For example, the sumps 80, 82 would typically include a separate drain (not shown) so that the evaporative liquid may be drained from the system to prevent freeze-up at certain times of year, such as during the winter months. The drain may include a control mechanism (not shown) such as a solenoid valve controlled by a temperature sensor so that the drain is opened when the ambient temperature falls below freezing, for example. The valve may be connected to be controlled by the central programmable logic element 78, or it could be manually operated or controlled based upon its own sensing system or device. A solenoid valve could also be used to automatically drain the coils of either the dry indirect contact heat exchange section 16 or the second indirect contact heat exchange section 28 in the event that the process fluid temperature falls close to the freezing point.

The water-saving advantages of the present invention can be illustrated by considering the dry bulb and wet bulb temperature profiles for a particular location, such as Stuttgart/Echterdingen AB, Germany, for example. The dry bulb temperature for this location should be below 15° C. or 59° F. for 70.3% of the year during the spring, fall and winter. For about 17.7% of the year, the dry bulb temperature is above 15° C. or 59° F. but the wet bulb temperature is below 15° C. or 59° F. Both the dry bulb and wet bulb temperatures are above 15° C. or 59° F. for about 12% of the year. With the present invention, the heat exchange system may be operated in Mode 1 as a dry apparatus, with no evaporative liquid used, for 70.3% of the time. When the ambient dry bulb temperature is above 15° C. or 59° F. but the wet bulb temperature is below 15° C. or 59° F., the heat exchange apparatus 10 may be operated in Mode 2, with minimal losses of evaporative liquid. When both the wet bulb and dry bulb ambient temperatures are above 15° C. or 59° F., the heat exchange system may be operated in Mode 3. It should be understood that the particular cut-off temperatures for operation in the various modes are given for purposes of illustration only. The actual cut-offs for operation in the various modes may instead depend directly on the process fluid temperature or pressure demand downstream of the dry indirect contact heat exchange section 16, such as at the process fluid outlet 14. The cut-off process fluid temperatures and pressures should correlate roughly with the ambient temperatures so that the usage periods for each of the modes of operation should follow the percentages described above. The actual percentage operable time of each mode of operation will depend on the particular annual temperature profile for the location and on the design cut off temperatures (air dry bulb temperature design cut offs) for which the apparatus was sized. The changes between each mode can be through automatic controls, as described above, or through a manual process.

In selecting components, the particular devices used for the dry indirect contact heat exchange section 16 and second indirect contact heat exchange section 28 may be selected based upon standard engineering design principles. The dry indirect contact heat exchange section 16 is sized to accomplish most of the thermal duty in the dry mode (Mode 1, shown in FIG. 9); in this mode, the second indirect contact heat exchange section 28, depending on its size, will add some thermal capacity, but the dominant heat exchanger will be the finned tubes 26 of the dry indirect contact heat exchange section 16. However, in the wet modes of operation (Modes 2 and 3, shown in FIGS. 10–11), the second indirect contact heat exchange section 28 will do a majority of the thermal duty, and the finned coils 16 will do the remaining thermal duty. The actual thermal duty percentages for each section will depend on the relative size of both heat exchangers 16, 28. If the application calls for constant thermal duty over the course of an entire year, one would select a large dry indirect contact heat exchange section 16 and a relatively small second indirect contact heat exchange section 28. If the summer duty, and wet operation, is anticipated to be greater than the winter duty, and dry operation, then a larger second indirect contact heat exchange section 28 would be selected.

The present invention also provides a method of extracting heat from process fluids. Process fluid is passed through the dry indirect contact heat exchange section 16 while a main air stream 132 also passes through the dry indirect contact heat exchange section 16. Process fluid also passes through a second indirect contact heat exchange section 28 while a second air stream 61 passes through the second indirect contact heat exchange section 28. A third air stream 68 passes through the direct contact heat exchange section 50. The second and third air streams 61, 68 are mixed together to define the main air stream 132 upstream of the dry indirect contact heat exchange section 16. A fourth air stream 72 may be selectively mixed with the second and third air streams 61, 68 upstream of the dry indirect contact heat exchange section 16. The fourth air stream 72 comprises ambient air.

In the method, evaporative liquid is selectively distributed over the second indirect contact heat exchange section 28 while the process fluid passes through the second indirect contact heat exchange section 28. The evaporative liquid from the second indirect contact heat exchange section 28 is collected and selectively distributed over the direct contact heat exchange section 50. The evaporative liquid from the direct contact heat exchange section 50 is collected and collected evaporative liquid is selectively distributed over the second indirect contact heat exchange section 28.

The act of selectively distributing collected evaporative liquid over the direct contact heat exchange section 50 is independent of the act of selectively distributing evaporative liquid over the second indirect contact heat exchange section 28: evaporative liquid can be distributed over the second indirect contact heat exchange section 28 alone, over the direct contact heat exchange section 50 alone, and over both heat exchange sections 28, 50 at the same or different flow rates. The low wall 84 allows for evaporative liquid to flow from one sump to the other sump depending on the mode of operation and how the two pumps balance out. The evaporative liquid may flow over the low wall from the indirect section sump 82 to the direct section sump 80 when the flow of evaporative liquid to the indirect contact heat exchange section 28 exceeds the flow of evaporative liquid to the direct contact heat exchange section 50, and may flow over the low wall from the direct section sump 80 to the indirect section sump 82 when the flow of evaporative liquid to the direct contact heat exchange section 50 exceeds the flow of evaporative liquid to the indirect contact heat exchange section 28. Although the wall 84 is shown and has been described as a low wall, it should be understood that other structures that allow for such flow of evaporative liquid between the sumps 82, 80 can be used. For example, a higher dividing wall with apertures allowing for evaporative liquid flow could be used.

During operation of the heat exchange system 8, the second and third air streams 61, 68 pass through the second indirect and direct contact heat exchange sections 28, 50 continuously, both with and without distribution of evaporative liquid in these heat exchange sections 28, 50. Process fluid flows through both the dry indirect and second indirect contact heat exchange sections 16, 28 both with and without the distribution of evaporative liquid in the second indirect and direct contact heat exchange sections 28, 50.

The method may include the act of sensing the ambient air temperature. Sensing may be done through a temperature sensor or by an operator observing a thermometer. The acts of selectively distributing evaporative liquid over the second indirect contact heat exchange section and selectively distributing evaporative liquid over the direct contact heat exchange section may be based upon the sensed ambient temperature.

The method may include the act of sensing a physical characteristic or property of the process fluid downstream of the dry indirect contact heat exchange section 16, such as just upstream of the process fluid outlet 14. The sensed physical characteristic may be temperature or pressure. The acts of selectively distributing evaporative liquid over the second indirect contact heat exchange section and selectively distributing evaporative liquid over the direct contact heat exchange section may be based upon the sensed temperature or pressure.

Since the system and method of the present invention limit the use of evaporative liquid to those times when it is most efficient, the present invention provides the benefit of an evaporative heat exchanger while conserving evaporative liquid. Since the second indirect contact heat exchange section 28 is not above the direct contact heat exchange section 50, the size and height of the direct contact heat exchange section 50 may be optimized without adding to the overall height of the apparatus; a larger direct contact heat exchange section 50 can be used. In addition, with the three heat exchange sections positioned side-by-side, the overall height of the apparatus can be reduced to a minimum, and the pumping head is reduced for the evaporative liquid. The cost of back-up pumps is thereby reduced. The separate piping arrangements for delivering the evaporative liquid to the direct and second indirect contact heat exchange sections allows for the optimization of thermal capability for each section; in addition, a full spray flow may be maintained over the second indirect contact heat exchange section 28 to minimize the potential for scale formation while the spray flow over the direct contact heat exchange section is independently regulated. Another advantage of the present invention results from the fact that the air streams pass through the dry indirect contact heat exchange section 16 after passing through the evaporative liquid and prior to exiting the apparatus: the air stream is reheated by the dry indirect contact heat exchange section before exiting the apparatus, thereby limiting plume formation in the discharge.

It should be understood that although the illustrated embodiments show many of the various components of the heat exchange system within a single apparatus, some components could be placed in a separate apparatus. For example, the direct contact heat exchange section 50 could be housed in a separate apparatus, with a duct provided to the plenum 58 in the apparatus housing the dry indirect contact heat exchange section 16. And as discussed above, the controller 78 could be part of the apparatus, part of an overall control system for a plant, or a stand alone controller such as a computer terminal.

Additional elements may be used in the systems of the present invention. For example, as shown in FIGS. 1–2, walls 150 may be provided as needed for control of air flow and retention of evaporative liquid from the spray nozzles 108.

While only specific embodiments of the invention have been described and shown, it is apparent that various additions and modifications can be made thereto, and that substitutions may be made for various elements of the invention. It is therefore the intention in the appended claims to cover all such additions, modifications and substitutions as may fall within the true scope of the invention.

We claim:

1. A method of extracting heat from a process fluid comprising:
    passing the process fluid through a dry indirect contact heat exchange section while passing a main air stream through the dry indirect contact heat exchange section;
    passing the process fluid through a second indirect contact heat exchange section while passing a second air stream through the second indirect contact heat exchange section;
    passing a third air stream through a direct contact heat exchange section and mixing the second and third air streams together to define the main air stream upstream of the dry indirect contact heat exchange section;
    selectively distributing an evaporative liquid over the second indirect contact heat exchange section while passing the process fluid through the second indirect contact heat exchange section;
    collecting evaporative liquid from the second indirect contact heat exchange section; and selectively distributing collected evaporative liquid over the direct contact heat exchange section;

wherein the act of selectively distributing collected evaporative liquid over the direct contact heat exchange section is independent of the act of selectively distributing evaporative liquid over the second indirect contact heat exchange section.

2. The method of claim 1 further comprising the act of selectively mixing a fourth air stream with the second and third air streams upstream of the dry indirect contact heat exchange section, the fourth air stream comprising ambient air.

3. The method of claim 1 further comprising the act of sensing the ambient air temperature and wherein the acts of selectively distributing an evaporative liquid over the second indirect contact heat exchange section and the act of selectively distributing collected evaporative liquid over the direct contact heat exchange section are based upon the sensed ambient temperature.

4. The method of claim 1 further comprising the act of sensing a physical characteristic of the process fluid downstream of the dry indirect contact heat exchange section and wherein the acts of selectively distributing an evaporative liquid over the second indirect contact heat exchange section and the act of selectively distributing collected evaporative liquid over the direct contact heat exchange section are based upon the sensed physical characteristic of the process fluid.

* * * * *